(12) United States Patent
Masukawa et al.

(10) Patent No.: US 8,105,675 B2
(45) Date of Patent: Jan. 31, 2012

(54) HONEYCOMB STRUCTURE AND BONDING MATERIAL TO BE USED FOR SAME

(75) Inventors: Naoshi Masukawa, Kitanagoya (JP); Atsushi Watanabe, Nagoya (JP); Shuichi Ichikawa, Handa (JP); Osamu Yamakawa, Kani (JP); Tetsuhiro Honjo, Kani (JP)

(73) Assignees: NGK Insulators, Ltd., Nagoya (JP); NGK Adrec Co., Ltd., Kani (JP)

( * ) Notice: Subject to any disclaimer, the term of this patent is extended or adjusted under 35 U.S.C. 154(b) by 241 days.

(21) Appl. No.: 12/204,584

(22) Filed: Sep. 4, 2008

(65) Prior Publication Data
US 2009/0011178 A1 Jan. 8, 2009

Related U.S. Application Data

(63) Continuation of application No. PCT/JP2007/055457, filed on Mar. 16, 2007.

(30) Foreign Application Priority Data

Mar. 17, 2006 (JP) ................................ 2006-073817

(51) Int. Cl.
| | |
|---|---|
| *B32B 3/12* | (2006.01) |
| *C03C 13/06* | (2006.01) |
| *C04B 35/00* | (2006.01) |
| *C04B 37/00* | (2006.01) |

(52) U.S. Cl. ....... 428/116; 501/36; 501/95.1; 156/89.22
(58) Field of Classification Search ........................ None
See application file for complete search history.

(56) References Cited

U.S. PATENT DOCUMENTS

| | | | |
|---|---|---|---|
| 4,304,585 A | 12/1981 | Oda et al. | |
| 4,335,783 A | 6/1982 | McBrayer et al. | |
| 4,357,987 A | 11/1982 | Oda et al. | |
| 5,811,360 A | 9/1998 | Jubb | |
| 5,914,187 A | 6/1999 | Naruse et al. | |
| 5,955,389 A | 9/1999 | Jubb | |
| 5,994,247 A | 11/1999 | Jubb et al. | |
| 6,180,546 B1 | 1/2001 | Jubb et al. | |
| 2003/0072914 A1 | 4/2003 | Tanaka et al. | |

(Continued)

FOREIGN PATENT DOCUMENTS

JP    B2-61-51240    11/1986

(Continued)

OTHER PUBLICATIONS

Shabanova et al. "Aggregation Stability of Colloidal Silica Sol-Polystyrene Latex Mixtures," *Colloid Journal*, vol. 63, No. 5, pp. 649-652, 2001.

(Continued)

*Primary Examiner* — Gordon R Baldwin
(74) *Attorney, Agent, or Firm* — Oliff & Berridge, PLC

(57) ABSTRACT

There is disclosed a honeycomb structure 1 which is made of a ceramic material and in which a plurality of honeycomb segments 12 having cell structures 5 and porous outer walls 7 on outer peripheries of the cell structures 5 are integrated by bonding the outer walls 7 to one another with a bonding material, each of the cell structures being provided with a plurality of cells 3 constituting fluid channels divided by porous partition walls 2, wherein the bonding material contains a bio-soluble fiber. The honeycomb structure 1 of the present invention has a performance equivalent to that of a honeycomb structure in which a heretofore used ceramic fiber is contained.

17 Claims, 2 Drawing Sheets

U.S. PATENT DOCUMENTS

| | | |
|---|---|---|
| 2005/0014624 A1 | 1/2005 | Jubb et al. |
| 2005/0076626 A1 | 4/2005 | Kudo et al. |
| 2005/0109023 A1 | 5/2005 | Kudo et al. |
| 2005/0272602 A1 | 12/2005 | Ninomiya |

FOREIGN PATENT DOCUMENTS

| | | |
|---|---|---|
| JP | A-08-506561 | 7/1996 |
| JP | B2-3121497 | 10/2000 |
| JP | 2003-105662 | 4/2003 |
| JP | A-2005-154202 | 6/2005 |
| WO | WO 94/15883 | 7/1994 |
| WO | WO 03/067041 A1 | 8/2003 |

OTHER PUBLICATIONS

Supplementary European Search Report issued on Mar. 10, 2010 in European Patent Application No. 07738902.1.

Gulati, Suresh T. "Strength and Thermal Shock Resistance of Segmented Wall-Flow Diesel Filters" Corning Class Works, NY. (1986).

US 8,105,675 B2

HONEYCOMB STRUCTURE AND BONDING MATERIAL TO BE USED FOR SAME

TECHNICAL FIELD

The present invention relates to a honeycomb structure and a bonding material for use in the structure. More particularly, it relates to a honeycomb structure which contains a biosoluble fiber, whereby environmental safety is improved.

BACKGROUND ART

A honeycomb structure made of a ceramics has been used in a catalyst carrier for an internal combustion engine, a boiler, a chemical reaction device, a reformer for a fuel cell and the like in which a catalyst function is used, a trapping filter of fine particles in an exhaust gas, particularly diesel fine particles (a diesel particulate filter, hereinafter sometimes referred to as the "DPF"), and the like.

In general, as shown in FIGS. 2(a) and 2(b), a honeycomb structure for use in such purposes has a structure which includes a plurality of cells 23 constituting fluid channels divided by porous partition walls 24 and in which adjacent cells 23 are alternatively plugged on the opposite end portions so that end faces have a checkered pattern. In a honeycomb structure 21 having such a structure, a fluid to be treated flows into the cell 23 not plugged on an inflow hole side end face 25, that is, the cell 23 with a plugged end portion on an outflow hole side end face 26, and the fluid passes through the porous partition wall 24, and is discharged from the adjacent cell 23, that is, the cell 23 with a plugged end portion on the inflow hole side end face 25 and not plugged on the outflow hole side end face 26. In this case, the partition walls 24 function as a filter. When the structure is used as, for example, the DPF, a particulate matter (hereinafter sometimes referred to as the "PM") such as soot discharged from a diesel engine is trapped by the partition walls 24 and accumulates on the partition walls 24.

The honeycomb structure used in this manner has a problem such that a temperature distribution in the honeycomb structure becomes nonuniform owing to the rapid temperature change of the exhaust gas or local heat generation, and thereby cracks are generated in the honeycomb structure. In particular, when the structure is used as the DPF, a particulate matter such as the accumulated soot needs to be burnt and removed to regenerate the structure. In this case, local temperature rise is caused, which results in problems that a regeneration efficiency lowers owing to the nonuniformity of a regeneration temperature and that the cracks due to a large thermal stress are easily generated.

In addition, in a case where the ceramic honeycomb structure provided with a plurality of cells extending therethrough is used as a dust-collecting filter for use in a corrosive gas atmosphere at a high temperature, for example, the diesel particulate filter (DPF) which traps the particulate matter (PM) discharged from the diesel engine, owing to the local heat generation accompanying the abnormal burning of the PM, thermal shock brought by the rapid temperature change of the exhaust gas, and the like, the nonuniform temperature distribution is generated in the structure, and the thermal stress acts. As a result, the ceramic honeycomb structure might incur the crack generation or melting.

To solve this problem, a method is suggested in which a plurality of divided segments of the honeycomb structure are bonded with a bonding material. Specifically, a method for manufacturing the honeycomb structure in which a large number of honeycomb bodies (segments) are bonded together with discontinuous bonding materials is disclosed (for example, see Patent Document 1).

Moreover, a method for manufacturing a thermal-shock-resistant rotary heat storage type ceramic heat exchanger is suggested in which the matrix segments of the honeycomb structure constituted of a ceramic material are formed by extrusion, fired, and then the outer peripheral portions of the segments are processed to be flat and smooth. Afterward, the bonding portions of the segments are coated with a ceramic bonding material in which a fired mineral composition is substantially the same as that of the matrix segments and in which a thermal expansion ratio difference is 0.1% or less at 800° C., and they are fired (for example, see Patent Document 2).

Furthermore, a ceramic honeycomb structure is disclosed in which cordierite honeycomb segments are bonded with the same material of cordierite cement (for example, see Non-Patent Document 1).

In the honeycomb structure in which such honeycomb segments are integrated using the bonding material, it is an important theme to secure a bonding strength between the honeycomb segments, but a bonding defect is sometimes generated. For example, bonding layers are cracked owing to the difference of the thermal expansion ratio or a contraction ratio due to the firing between the bonding layers and the honeycomb segments, or the bonding layers themselves peel. In particular, in the honeycomb structure of a large size, especially with a channel (cell) length of 50 mm or more, the difference of the thermal expansion or the contraction due to the firing between the bonding layers and the honeycomb segments remarkably increases. Therefore, there is a problem that it is difficult to obtain a honeycomb structure of a large size in which any bonding defect is not generated in the bonding layers (the bonding portions).

To solve such problems, a honeycomb structure is suggested in which a plurality of honeycomb segments are securely bonded to one another without generating any bonding defect such as crack or peel in the bonding portions of these segments. Moreover, a method for manufacturing a honeycomb structure having such characteristics is suggested. Furthermore, a honeycomb structure made of a ceramic material is suggested in which there a bonding material capable of bonding together bodies to be bonded without generating any bonding defect such as the crack or peel in the bonded portions is used. In the honeycomb structure, a plurality of honeycomb segments provided with cell structures having a plurality of cells constituting fluid channels divided by porous partition walls and porous outer walls on outer peripheries of the cell structures, the bonding material containing colloidal silica or the like is dried to form the bonding layers on the outer walls, and the outer walls are bonded to one another via the bonding layers (see Patent Document 3).

In addition, a ceramic structure is suggested in which a plurality of ceramic members are united to form an aggregate. Each of the ceramic members has a plurality of through holes arranged in a longitudinal direction, and these through holes are plugged on the end faces so that each of the end faces has a checkered pattern. Moreover, the through holes have a reversed opening/closing relation on gas inlet and outlet sides. Furthermore, air can pass through the adjacent through holes via the porous partition walls. In the ceramic structure, a portion between the ceramic members is filled with a material constituted of at least an inorganic fiber, an inorganic binder, an organic binder, and inorganic particles, dried, and hardened to form an elastic seal material having a structure in which the inorganic fiber, the inorganic particles, and a ceramic material formed by heating and firing the inorganic binder three-dimensionally cross one another. The respective ceramic members are integrally bonded via the sealing material. In particular, as the inorganic particles, at least one or more types of inorganic powder or whisker selected from the group consisting of silicon carbide, silicon nitride and boron nitride are used. As the inorganic fiber, at least one or more ceramic fibers selected from the group consisting of silica-alumina, mullite, alumina, and silica are suggested (see Patent Document 4).

With regard to the conventional ceramic fiber, it has been necessary to consider that there is a possibility of affecting a human body when particle diameters, a composition, and an existence form satisfy conditions within certain values. Therefore, to manufacture the honeycomb structure in consideration of health, a new approach different from the above conventional technology has been demanded.

Thus, as a honeycomb structure using a bio-soluble fiber, a honeycomb structure formed of nonwoven cloth using the bio-soluble fiber is suggested. This honeycomb structure is formed by alternately laminating flat-plate-like nonwoven cloth and waveform-like nonwoven cloth, and the nonwoven cloth is formed of the bio-soluble fiber and a binder (see Patent Document 5). Therefore, the presence of the binder is essential for this honeycomb structure of Patent Document 5, and the structure could not be used in the heretofore used honeycomb structure and the bonding material for the structure. Moreover, the structure is thermally resistant to 800° C. or more, and hence the structure cannot sufficiently bear the use at 1200° C. or more as a honeycomb structure made of a ceramics for use as a catalyst carrier for an internal combustion engine, a boiler, a chemical reaction device, a reformer for a fuel cell, or the like in which a catalyst function is used, or as a DPF or the like which traps a PM in an exhaust gas.

Patent Document 1: U.S. Pat. No. 4,335,783
Patent Document 2: JP-B-61-51240
Patent Document 3: JP-A-2005-154202
Patent Document 4: JP Patent No. 3121497
Patent Document 5: JP-A-2003-105662
Non-Patent Document 1: SAE Paper 860008 (1986)

DISCLOSURE OF THE INVENTION

The present invention has been developed in view of the problem of such a conventional technology, and an object thereof is to provide a honeycomb structure having a performance equivalent to that of a heretofore generally used honeycomb structure containing a ceramic fiber in a bonding material while any influence on the health of a human body does not have to be considered. A further object thereof is to suggest a bonding material using a fiber which obviates the need for considering any influence on the health of a human body as the bonding material of the honeycomb structure.

To achieve the above objects, the present inventors have earnestly continued researches and eventually developed the following invention. That is, according to the present invention, the following honeycomb structure and a bonding material for use in manufacturing the honeycomb structure are provided.

[1] A honeycomb structure made of a ceramics, consisting of a plurality of honeycomb segments provided with cell structures having a plurality of cells constituting fluid channels divided by porous partition walls and porous outer walls on outer peripheries of the cell structures, and integrated by bonding the outer walls to one another with a bonding material, wherein the bonding material contains a bio-soluble fiber.

[2] The honeycomb structure according to the above [1], wherein the bio-soluble fiber has thermal resistance at a temperature of 1200° C. or more.

[3] The honeycomb structure according to the above or [2], wherein the bio-soluble fiber contains 60 to 95 mass % of $SiO_2$.

[4] The honeycomb structure according to any one of the above [1] to [3], wherein the content of an alkali metal oxide in the bio-soluble fiber is 2 mass % or less.

[5] The honeycomb structure according to any one of the above [1] to [4], wherein the bonding material further contains inorganic particles and/or a colloidal oxide.

[6] The honeycomb structure according to the above [5], wherein the inorganic particles contained in the bonding material are silicon carbide.

[7] The honeycomb structure according to any one of the above [1] to [6], wherein the bonding material further contains an inorganic binder.

[8] The honeycomb structure according to any one of the above [1] to [7], wherein the bonding material further contains an organic binder.

[9] The honeycomb structure according to any one of the above [1] to [8], wherein the bio-soluble fiber has an average length of 10 to 600 μm, and has an average diameter of 0.1 to 10 μm.

[10] The honeycomb structure according to any one of the above [1] to [9], wherein a bonding material slurry for use as the bonding material has a pH of 0.5 to 10.

[11] The honeycomb structure according to any one of the above [1] to [10], wherein the bonding material has a four-point bending strength of 100 to 3000 kPa.

[12] The honeycomb structure according to any one of the above [1] to [11]), wherein the bonding material has a compression Young's modulus of 5 to 500 MPa.

[13] The honeycomb structure according to any one of the above [1] to [12], wherein the bonding material has a thermal conductivity of 0.1 to 10 W/mK.

[14] The honeycomb structure according to any one of the above [1] to [13], wherein the bonding material has a thermal expansion coefficient of $1 \times 10^{-6}$ to $8 \times 10^{-6}$/K.

[15] The honeycomb structure according to any one of the above [1] to [14], wherein the bonding material has a thermal capacity of 400 to 4500 $Jm^3/K$.

[16] The honeycomb structure according to any one of the above [1] to [15], wherein the bonding material has a porosity of 17 to 70%.

[17] The honeycomb structure according to any one of the above [1] to [16], wherein the bonding material has a density of 0.5 to 3 $g/cm^3$.

[18] The honeycomb structure according to any one of the above [1] to [17], wherein a layer formed of the bonding material has a thickness of 0.1 to 5 mm.

[19] A ceramic bonding material containing a bio-soluble fiber having thermal resistance at 1200° C. or more and containing 60 to 95 mass % of $SiO_2$.

In the honeycomb structure of the present invention, a bonding material constituted of a component in which any influence on the health of a human body does not have to be considered is dried to form a bonding layer, and outer walls are bonded to one another via these bonding layers, hence environment safety is improved. Moreover, the honeycomb structure of the present invention produces an effect that honeycomb segments are securely bonded to one another without generating any bonding defect such as crack or peel in bonding portions.

DESCRIPTION OF REFERENCE NUMERALS

1: honeycomb structure, 2: partition wall, 3: cell, 5: cell structure, 7: outer wall, 8: bonding layer, 12: honeycomb segment, 21: honeycomb structure, 23: cell, 24: partition wall, 25: inflow hole side end face, 26: outflow hole side end face.

BEST MODE FOR CARRYING OUT THE INVENTION

An embodiment of the present invention will hereinafter be described, but it should be understood that the present invention is not limited to the following embodiment, and is appropriately subjected to design change, improvement, and the like based on the ordinary knowledge of any one skilled in the art within the scope of the present invention.

Figure 1A:
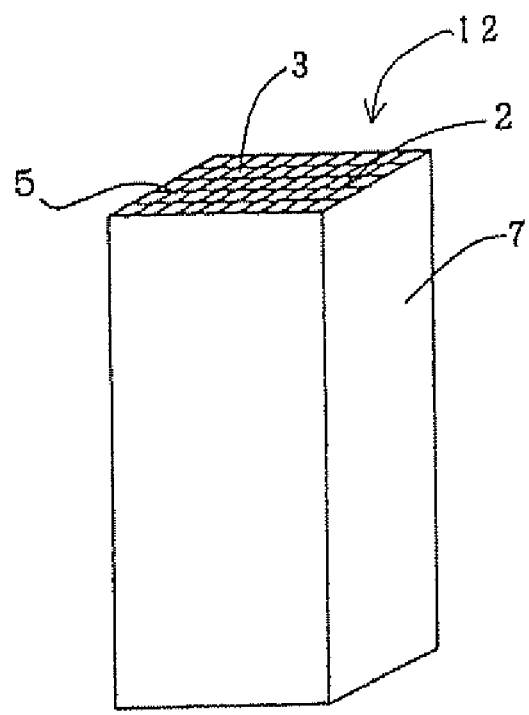
FIG. 1(a) is a diagram showing one embodiment of a honeycomb structure according to the present invention, and is a perspective view showing a honeycomb segment.
Figure 1B:
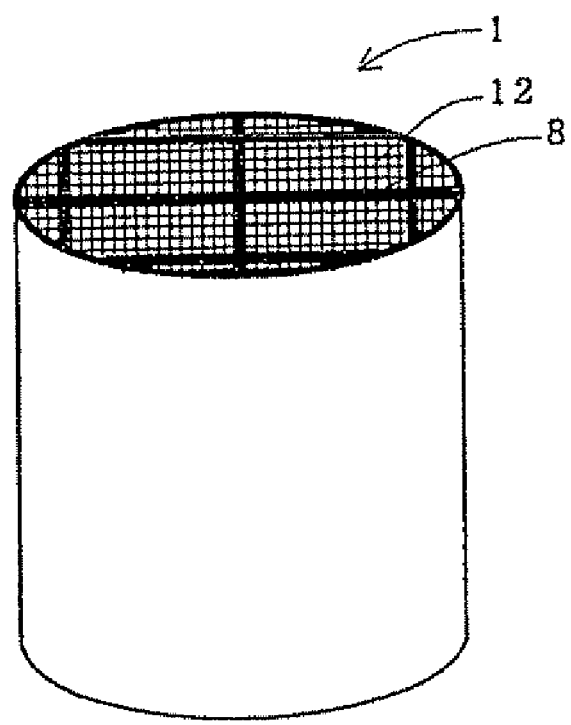
FIG. 1(b) is a diagram showing one embodiment of a honeycomb structure according to the present invention, and is a perspective view showing the honeycomb structure.
Figure 1C:
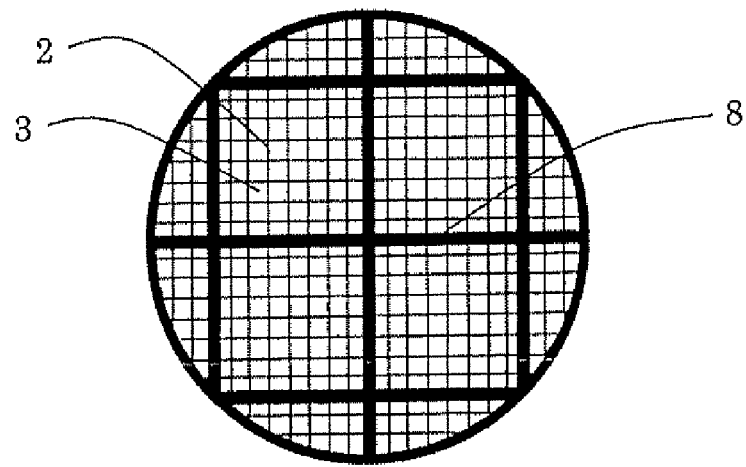
FIG. 1(c) is a diagram showing one embodiment of a honeycomb structure according to the present invention, and is a top plan view showing the honeycomb structure.
Figure 2A:
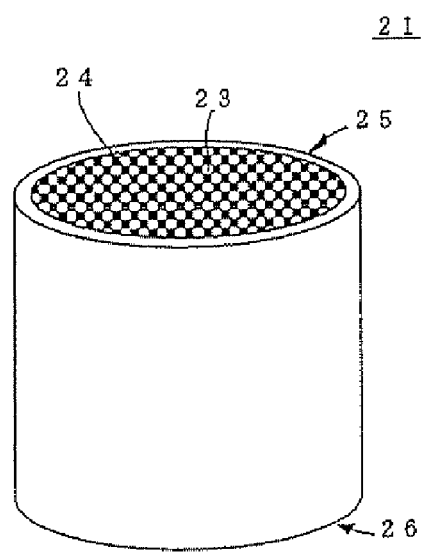
FIG. 2(a) is a diagram showing a general honeycomb structure, and is a perspective view showing the honeycomb structure.
Figure 2B:
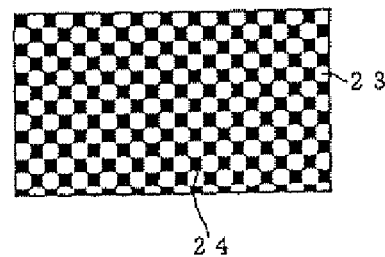
FIG. 2(b) is a diagram showing a general honeycomb structure, and is a partially enlarged plan view showing an end face of the honeycomb structure.

FIGS. 1(a) to 1(c) are diagrams showing one embodiment of a honeycomb structure according to the present invention, FIG. 1(a) is a perspective view showing a honeycomb segment, FIG. 1(b) is a perspective view showing the honeycomb structure, and FIG. 1(c) is a top plan view showing the honeycomb structure. In a honeycomb structure 1 of the present embodiment consisting of a plurality of honeycomb segments 12 provided with cell structures 5 having a plurality of cells 3 constituting fluid channels divided by porous partition walls 2 and porous outer walls 7 on outer peripheries of the cell structures 5, and integrated by bonding the outer walls 7 to one another with a bonding material, the bonding material contains a bio-soluble fiber. In the honeycomb structure 1 of the present embodiment, this bonding material is dried to form bonding layers 8 on the outer walls 7, and the outer walls 7 are bonded to one another via the bonding layers 8.

The "bio-soluble fiber" is a fiber which is non-durable in a physiological solution and which is other than the control target of cancer-causing classification. The examples of the physiological solution include physiological saline (a 0.9% sodium chloride solution), a buffer solution, a pseudo body fluid and serum. The pseudo body fluid is an aqueous solution which contains substantially the same component as a human plasma component.

The "fiber" is a material having a length which is larger than a width. In a specific embodiment, a fiber having a length at least five times, ten times or 100 times the diameter thereof can appropriately be selected and used in accordance with a purpose.

In general, the bio-soluble fiber is dissolved or substantially dissolved in the physiological solution within about one year. To be "substantially dissolved" means to be dissolved as much as at least about 75 mass %.

In general, examples of the bio-soluble fiber for use in the present embodiment include inorganic oxides such as $Na_2O$, $K_2O$, CaO, MgO, $P_2O_5$, $Li_2O$, BaO, and a combination of them with silica. Other metal oxides or other ceramic components may be contained in the bio-soluble fiber. However, these components themselves do not have any desired solubility, and are present in such a sufficiently small amount that the fiber can entirely be decomposed in the physiological solution. Examples of such a metal oxide include $Al_2O_3$, $TiO_2$, $ZrO_2$, $B_2O_3$, and iron oxides. The bio-soluble fiber may contain a metal component in such an amount that the fiber can be decomposed in the physiological solution.

The content of $SiO_2$ in the bio-soluble fiber for use in the present embodiment is preferably 60 mass % or more, especially preferably 65 mass % to 95 mass %. With regard to the bio-soluble fiber having such a composition, the fiber is immobilized at a time when the inorganic binder is used in the bonding material, so that a sufficient strength is preferably exerted, and further thermal resistance is especially preferably imparted.

Furthermore, in the bio-soluble fiber for use in the present embodiment, the content of the alkali metal oxide is preferably 2 mass % or less. Here, examples of the alkali metal oxide include $Na_2O$ and $K_2O$. When the content of the alkali metal oxide is 2 mass % or less, the lowering of the strength of the bonding material during use at a high temperature of, for example, 1200° C. or more can be prevented.

Examples of the bio-soluble fiber for use in the present embodiment include fibers containing silica, magnesium, silica, the oxide of magnesium and the oxide of calcium. Such a fiber is usually referred to as a magnesium silicate or calcium magnesium silicate fiber.

The bio-soluble fiber is sold with a trade name of, for example, Super Wool from Shinnikka Thermal Ceramics Corporation. For example, Super Wool 607 contains 60 to 70 mass % of $SiO_2$, 25 to 35 mass % of CaO, 4 to 7 mass % of MgO and a small amount of $Al_2O_3$. Super Wool 607 Max contains 60 to 70 mass % of $SiO_2$, 16 to 22 mass % of CaO, 12 to 19 mass % of MgO and a small amount of $Al_2O_3$.

The bio-soluble fiber for use in the present embodiment may have various average diameter and length. For example, a commercially available fiber has an average fiber diameter in a range of about 0.05 to 15 μm. In particular, as the bio-soluble fiber, a fiber having an average fiber diameter in a range of 0.1 to 10 μm may preferably be used. An average length in a major axis direction is preferably 10 to 600 μm, further preferably 50 to 400 μm. When the average length in the major axis direction is below 10 μm, elasticity sometimes cannot be imparted to the bonding layer constituted of the bonding material. When the length exceeds 600 pmt, a coating property sometimes lowers.

The bonding material for use in the present embodiment contains the bio-soluble fiber. In addition, the material preferably contains, for example, an inorganic binder, an organic binder, inorganic particles, foam particles and the like.

Examples of the above inorganic binder include silica sol and alumina sol. They may be used alone or as a combination of two or more of them.

Examples of the above organic binder include polyvinyl alcohol (PVA), carboxymethyl cellulose (CMC) and methyl cellulose (NC). The adhesion of an interface between the bonding material and the segment is effectively improved.

Examples of the inorganic particles include ceramics such as silicon carbide, silicon nitride, cordierite, alumina, and mullite.

Moreover, the slurry of the bonding material for use in manufacturing the honeycomb structure of the present embodiment has a pH in a range of preferably 0.5 to 10, further preferably 2 to 8. When the pH is below 0.5, or 10 or more, the stability of the slurry lowers, and the coating property sometimes lowers. Moreover, the bonding between inorganic binders such as silica sol and alumina sol is disturbed, and the bonding material is sometimes easily cracked.

In the honeycomb structure of the present embodiment, the four-point bending strength of the bonding material (the bonding layer) is preferably in a range of 100 to 3000 kPa. In a case where the four-point bending strength of the bonding material is below 100 kPa, in the honeycomb structure in which the plurality of honeycomb segments are integrated with the bonding material, the strength of the bonding portions cannot be secured, and the bonding portions sometimes break owing to the rapid thermal stress generated during the regeneration of the DPF. On the other hand, when the strength is beyond 3000 MPa, the stress cannot be relaxed, and the honeycomb segments are sometimes cracked and broken owing to the rapid thermal stress generated during the regeneration of the DPF. The four-point bending strength functions further preferably in a range of 500 to 2000 kPa. It is to be noted that the four-point bending strength mentioned in the present description is a value measured in conformity to JIS R 1601 "Bending Strength Test Method of Fine Ceramics".

The compression Young's modulus in the Z-axis direction of the bonding material (the bonding layer) for use in the present embodiment is in a range of 5 to 500 MPa. In a case where the compression Young's modulus of the bonding material in the Z-axis direction is below 5 MPa, when there is a temperature distribution inside the honeycomb segments, the honeycomb segments themselves are largely deformed, and are sometimes cracked. On the other hand, in a case where the modulus is beyond 500 MPa, in the honeycomb structure in which a plurality of honeycomb segments are integrated with the bonding material regardless of the length of the honeycomb segments, the stress cannot be relaxed, and the outer peripheral portion of the structure is sometimes broken owing to the rapid thermal stress generated during the regeneration of the DPF. The compression Young's modulus is further preferably in a range of 5 to 100 MPa. It is to be noted that the compression Young's modulus of the bonding material in the Z-axis direction mentioned in the present description is a value calculated from a load and a displacement curve.

The porosity of the bonding material (the bonding layer) for use in the present embodiment is preferably 17 to 70%, further preferably 22 to 54%. When the porosity is below 17%, the Young's modulus increases, and a stress relaxation function sometimes cannot sufficiently be exerted. When the porosity exceeds 70%, the bonding strength between the honeycomb segment and the bonding material sometimes lowers. It is to be noted that the porosity can be measured with a mercury porosimeter or by Archimedes process. The above porosity values are values measured by the Archimedes process.

The bulk density of the bonding material (the bonding layer) for use in the present embodiment is preferably 0.5 to 3 g/cm$^3$, further preferably 0.8 to 2 g/cm$^3$. When the bulk density exceeds 3 g/cm$^3$, the Young's modulus increases, and the stress relaxation function sometimes cannot sufficiently be exerted. When the bulk density is below 0.5 g/cm$^3$, the bonding strength between the honeycomb segment and the bonding material sometimes lowers. It is to be noted that the bulk density mentioned in the present description is a value measured by the Archimedes process.

The thermal conductivity of the bonding material (the bonding layer) for use in the present embodiment is preferably 0.1 to 10 W/mK, further preferably 0.3 to 5 W/mK. When the thermal conductivity is below 0.1 W/mK, a maximum temperature during the regeneration increases. When the thermal conductivity exceeds 10 W/mK, a temperature gradient inside the segment increases, and the segment is sometimes easily cracked during the regeneration. It is to be noted that the thermal conductivity mentioned in the present description is a value measured by a laser flash process, using a cut bonding layer portion.

The thermal expansion coefficient of the bonding material (the bonding layer) for use in the present embodiment is preferably $1 \times 10^{-6}$ to $8 \times 10^{-6}$/K, further preferably $3 \times 10^{-6}$ to $6 \times 10^{-6}$/K. When the thermal expansion coefficient of the bonding material is below $1 \times 10^{-6}$/K, the interface between the bonding material and the honeycomb segment is sometimes easily cracked owing to the mismatching of the thermal expansion coefficient between the segment material and the bonding material during the regeneration. When the thermal expansion coefficient of the bonding material exceeds $8 \times 10^{-6}$/K, the bonding material is sometimes easily cracked during the regeneration. It is to be noted that the above-mentioned thermal expansion coefficient is a value in a temperature range of room temperature to 800° C.

The thermal capacity of the bonding material (the bonding layer) for use in the present embodiment is preferably 250 to 4500 Jm$^3$/K, further preferably 500 to 3000 Jm$^{31}$K. When the thermal capacity of the bonding material is below 250 Jm$^3$/K, a maximum temperature during the regeneration increases, and the segment is sometimes easily cracked. When the thermal capacity of the bonding material exceeds 4500 Jm$^3$/K, the temperature during the regeneration does not rise, and a temperature rise characteristic sometimes lowers. It is to be noted that the thermal capacity mentioned in the present description is a value calculated by multiplying, by the density, specific heat obtained by a laser flash process or with a differential thermal flow rate meter.

In the present embodiment, there is not any special restriction on the thickness of the bonding material (the bonding layer). However, when the material is excessively thick, a pressure loss excessively increases when exhaust gas passes therethrough. When the material is excessively thin, the bonding material unfavorably does not exert a sufficient bonding capability. The thickness of the bonding material (the bonding layer) is preferably 0.1 to 5.0 mm, further preferably 0.5 to 3.0 mm.

In the present invention, there is not any special restriction on the cell density (the number of the cells per unit cross-sectional area perpendicular to the channel) of the honeycomb segment. However, when the cell density is excessively small, a geometric surface area runs short. When the cell density is excessively large, the pressure loss unfavorably excessively increases. The cell density is preferably 0.9 to 310 cells/cm$^2$ (6 to 2000 cells/square inch). Moreover, there is not any special restriction on the cross-sectional shape of a cell (a cross section perpendicular to the channel), and there may be used a polygonal shape such as a triangular shape, a quadrangular shape, or a hexagonal shape, a circular shape, an elliptic shape, a combination of a octagonal shape and a quadrangular shape, or any shape such as a corrugated shape. From a viewpoint of manufacturing, a triangular shape, a quadrangular shape, a combination of the octagonal shape and a quadrangular shape, or a hexagonal shape is preferable. Moreover, there is not any special restriction on the thickness of the partition wall. However, when the partition wall is excessively thin, the strength of the honeycomb segment becomes insufficient. When the partition wall is excessively thick, the pressure loss unfavorably excessively increases. The thickness of the partition wall is preferably in a range of 50 to 2000 μm.

Moreover, there is not any special restriction on the shape of the honeycomb segment, and any shape may be used. For example, a plurality of square pole shown in FIG. 1(a) as a basic shape are preferably bonded and integrated as shown in FIG. 1(b). It is also preferable that the shape of the honeycomb segment 12 constituting the outermost peripheral surface of the honeycomb structure 1 is matched with the outer peripheral shape of the honeycomb structure 1. Furthermore, the shape of the cross section of each honeycomb segment perpendicular to the channel at may be a fan shape.

Furthermore, in the honeycomb structure, there is not any special restriction on the shape of the cross section perpendicular to the channel, and there may be used a circular shape such as a perfect circular shape, an elliptic shape, or an oval shape, a polygonal shape such as a triangular shape, a quadrangular shape, or a pentagonal shape, or any shape such as an amorphous shape. In addition, when the honeycomb structure of the present embodiment is used as the catalyst carrier to be incorporated in an internal combustion engine, a boiler, a chemical reaction device, a reformer for a fuel cell, or the like, the honeycomb structure preferably carries a metal having a catalyst capability. Typical examples of the metal having the catalyst capability include platinum (Pt), palladium (Pd), and rhodium (Rd). At least one of these metals is preferably carried by the honeycomb structure.

On the other hand, when the honeycomb structure of the present invention is used as a filter such as a DPF for trapping and removing a particulate matter (soot) contained in the exhaust gas, preferably, openings of the predetermined cells are plugged in one end face, and openings of the remaining cells are plugged in the other end face. It is also preferable that adjacent cells are plugged alternatively on the opposite end portions so that the end faces have a checkered pattern. The cells are plugged in this manner, whereby the soot-containing exhaust gas which has flowed into one end face side of the honeycomb structure passes through the partition walls, and is discharged from the other end face side. However, when the exhaust gas passes through the partition walls, the porous partition walls can perform the function of the filter to trap the soot. It is to be noted that when the trapped soot is accumulated on the partition walls, the pressure loss increases, so that a burden is imposed on the engine, and a fuel efficiency and drivability lower. Therefore, the soot is regularly burnt and removed by heating means such as a heater to regenerate the filter function. To promote the burning during this regeneration, the honeycomb structure may carry the above-described metal having the catalyst capability.

It is to be noted that as the material of the honeycomb segment for use in the present invention, there may be used one material selected from the group consisting of cordierite, mullite, alumina, spinel, silicon carbide, metal silicon, a silicon-silicon carbide based composite material, a silicon carbide-cordierite based composite material, silicon nitride, lithium aluminum silicate, and an Fe—Cr—Al based metal, or a combination of a plurality of materials selected from the group.

The honeycomb structure of the present invention is manufactured by bonding the honeycomb segments with the bonding material. As the raw materials of the honeycomb segments, for example, a binder such as methyl cellulose or hydroxymethyl cellulose, a surfactant, water, and the like are added to the above-mentioned material, and kneaded to form a plastic clay. Subsequently, the resultant clay is extruded and formed in a forming step, to form a formed honeycomb body having a plurality of cells constituting fluid channels divided by partition walls. During the extrusion forming, a plunger type extruder, a biaxial screw type continuous extruder or the like may be used. When the biaxial screw type continuous extruder is used, a clay step and a forming step can continuously be performed. The resultant formed honeycomb body can be dried by, for example, microwaves, dielectric heating and/or hot air, and then fired to obtain a fired honeycomb body.

The resultant fired honeycomb body is processed into a honeycomb segment having a predetermined shape by use of means such as a band saw or a metal saw, if necessary. In this manner, the square-pole-like honeycomb segment having a bonding surface (an outer wall) can be obtained. These honeycomb segments can be bonded to one another with a bonding material containing the above-mentioned bio-soluble fiber to obtain a honeycomb structure. There is not any special restriction on a method for coating the honeycomb segment with the bonding material, and, for example, a spray process, a coating process using a brush, a stylus or the like, a dipping process, or the like may be employed.

It is to be noted that at least a part of the outer surface of the honeycomb structure (a bonded body) formed by bonding the honeycomb segments to one another may be removed, if necessary. Specifically, for example, preferably two or more cells, further preferably two to four cells are removed from the outermost periphery. Here, to remove the cells is to remove at least a part of the partition walls forming the cells to obtain a state in which four peripheries are completely not surrounded with the partition walls.

When at least a part of the outer periphery of the bonded body is removed, the corresponding portion is coated with a coating material to form the outer peripheral wall of the honeycomb structure. The coating material preferably contains at least one selected from the group consisting of colloidal silica, colloidal alumina, a ceramic fiber, ceramic particles, an organic binder, an inorganic binder, and hollow particles. Examples of the ceramic particles include silicon carbide, cordierite, silica, alumina, and zirconia.

Next, one embodiment of a ceramic bonding material according to the present invention will be described. The ceramic bonding material of the present embodiment is a ceramic bonding material which contains the bio-soluble fiber having thermal resistance at 1200° C. or more and containing 60 to 95 mass % of $SiO_2$. This ceramic bonding material may preferably be used as a bonding material in bonding the honeycomb segments to one another in the honeycomb structure of the present invention. The ceramic bonding material of the present embodiment can securely bond the honeycomb segments to one another without generating a bonding defect such as crack or peel in bonded portions. The components in which any influence on the health of a human body does not have to be considered are used, so that an environment safety is improved.

As the bio-soluble fiber contained in the ceramic bonding material of the present embodiment, a fiber constituted in the same manner as in the bio-soluble fiber for use in the above bonding material of the honeycomb structure according to the present invention may preferably be used.

EXAMPLES

The present invention will hereinafter specifically be described in accordance with examples, but the present invention is not limited to these examples.

1. Manufacturing of Honeycomb Segment:

As a honeycomb segment raw material, SiC powder and metal Si powder were mixed at a mass ratio of 80:20, and starch and a foam resin as pore formers, further methyl cellulose, hydroxypropoxyl methyl cellulose, a surfactant, and water were added to the material to prepare a plastic clay. This clay was extruded, formed, and dried by microwaves and hot air to obtain a honeycomb segment formed body including partition walls having a thickness of 310 µm, having a cell density of about 46.5 cells/cm$^2$ (300 cells/square inch), having a square section with each 35 mm long side and having a length of 152 mm. In this honeycomb segment formed body, both end faces of the cells were plugged so that the end faces had a checkered pattern. That is, the cells were plugged so that adjacent cells were plugged alternatively on the opposite end portions. As a plugging material, a material similar to the honeycomb segment raw material was used. The both end faces of the cells were plugged, dried, then degreased in the atmosphere at about 400° C., and then fired in an Ar inactive atmosphere at about 1450° C. to obtain the honeycomb segment having a porous structure in which SiC crystal particles were bonded with Si.

2. Preparation of Bonding Material (Bonding Materials A to H):

40 mass % of SiC powder as inorganic particles having an average diameter of 2 µm, 30 mass % of an aqueous solution containing 40 mass % of silica gel as an inorganic binder, 1 mass % of clay and 29 mass % of bio-soluble fiber having characteristics shown in Table 2 were mixed. Water was added to the resultant mixture, and the mixture was kneaded using a mixer for 30 minutes to obtain bonding materials A to F having composition and characteristics shown in Table 1. Moreover, instead of the bio-soluble fiber, an alumino silicate fiber for use in manufacturing a conventional honeycomb structure was mixed at an equal amount ratio to obtain a bonding material G, and an alumina fiber was similarly mixed to obtain a bonding material H. These fibers had an average diameter of 5 µm and an average length of 50 µm.

TABLE 1

| | Characteristics of bio-soluble fiber | | | | |
|---|---|---|---|---|---|
| Bonding material | Thermal resistance (° C.) | SiO$_2$ amount (mass %) | MgO amount (mass %) | CaO amount (mass %) | Alkali metal oxide amount (mass %) |
| A | 1260 | 70 | 29.5 | — | 0.5 |
| B | 1260 | 65 | 34 | — | 1.0 |
| C | 1000 | 60 | — | — | 1.2 |
| D | 1000 | 50 | — | — | 1.5 |
| E | 1260 | 60 | 37 | — | 3.0 |
| F | 700 | 40 | — | — | 10.0 |

3. Manufacturing of Honeycomb Structure

Examples 1 to 6 and Comparative Examples 1, 2

Subsequently, 16 honeycomb segments were bonded to one another by use of the bonding materials (the bonding materials A to H) shown in Table 1, and dried at 200° C. for 2 hours. Afterward, an outer peripheral portion was ground so as to obtain a cylindrical shape, and the corresponding portion was coated with a coating material and subjected to a thermal treatment at 500° C. for 2 hours, to obtain honeycomb structures (Examples 1 to 6 and Comparative Examples 1, 2).

4. Evaluation and Results

Examples 1 to 6 and Comparative Examples 1, 2

These honeycomb structures (Examples 1 to 6 and Comparative Examples 1, 2) were attached to the exhaust tube of a diesel engine, and 8 g/L of soot was accumulated. Afterward, the soot was regenerated so that the center of each honeycomb structure had a temperature of 1200° C. With regard to the tested honeycomb structures, the appearances of honeycomb segments and bonding layers were observed with an optical microscope. Moreover, a part of the bonding layers was cut out, and fiber shapes were confirmed with an SEM. Ten samples for a predetermined strength test were cut from each structure, and subjected to measurement of a three-point bending bonding strength according to JIS R 1601. The evaluation results are shown in Table 2.

TABLE 2

| | Bonding material used | Fiber shape | Honeycomb segment | Bonding layer | Bonding strength [MPa] |
|---|---|---|---|---|---|
| Example 1 | A | No change | No crack | No crack | 3.8 |
| Example 2 | B | No change | No crack | No crack | 3.5 |
| Example 3 | C | Partial melting | Cracked | No crack | 2.9 |
| Example 4 | D | Partial melting | Cracked | Cracked | 1.5 |
| Example 5 | E | No change | Cracked | Cracked | 1.2 |
| Example 6 | F | Partial melting | Cracked | Cracked | 0.6 |
| Comparative Example 1 | G | No change | No crack | No crack | 3.5 |
| Comparative Example 2 | H | No change | No crack | No crack | 3.2 |

5. Preparation of Bonding Material (Bonding Material A-1 to A-18)

The same composition as that of the bonding material A used in Example 1 was used, and an organic binder, a foam resin, a dispersant, and the like were added to a bio-soluble fiber having a shape shown in Tables 3 and 4, and blended therewith as shown in Tables 3 and 4, to prepare bonding materials A-1 to A-18. Tables 3 and 4 show the blend prescriptions of the bonding materials A-1 to A-18. The porosity (%) and bulk density (g/cm$^3$) of the bonding layer were measured using samples cut from bonding layers formed of the bonding materials A-1 to A-18. It is to be noted that the porosity and bulk density of the bonding layer were measured by Archimedes process.

TABLE 3

| Bonding material | Inorganic fiber Average length [μm] | Inorganic fiber Average diameter of cross section [μm] | Organic binder [mass %] | Dispersant [mass %] | pH of bonding material slurry | Porosity [%] | Bulk density [g/cm³] | Others |
|---|---|---|---|---|---|---|---|---|
| A-1 | 50 | 5 | — | 0.3 | 6.0 | 45 | 1.6 | Dispersant: 0.3 mass % / Foam resin: 1.0 mass % |
| A-2 | 300 | 5 | — | 0.5 | 6.0 | 50 | 1.4 | Dispersant: 0.5 mass % / Foam resin: 1.0 mass % |
| A-3 | 500 | 5 | — | 0.7 | 6.0 | 65 | 1.0 | Dispersant: 0.7 mass % / Foam resin: 1.0 mass % |
| A-4 | 300 | 5 | CMC 0.1 | 0.3 | 5.0 | 60 | 1.1 | Dispersant: 0.3 mass % / Foam resin: 1.0 mass % |
| A-5 | 300 | 5 | CMC 0.4 | 0.3 | 5.0 | 60 | 1.1 | Dispersant: 0.3 mass % / Foam resin: 1.0 mass % |
| A-6 | 300 | 5 | CMC 0.8 | 0.3 | 5.0 | 60 | 1.1 | Dispersant: 0.3 mass % / Foam resin: 1.0 mass % |
| A-7 | 200 | 5 | PVA 1.0 | — | 1.0 | 60 | 1.1 | Foam resin: 1.0 mass % / pH adjustment in HCl |
| A-8 | 300 | 5 | PVA 1.0 | — | 8.0 | 60 | 1.1 | Foam resin: 1.0 mass % / pH adjustment in NaOH |
| A-9 | 200 | 5 | — | — | 4.8 | 50 | 1.6 | SiC powder particle diameter: 50 μm |

*1 CMC is carboxymethyl cellulose.
*2 PVA is polyvinyl alcohol.

TABLE 4

| Bonding material | Inorganic fiber Average length [μm] | Inorganic fiber Average diameter of cross section [μm] | Organic binder [mass %] | pH of bonding material slurry | Porosity [%] | Bulk density [g/cm³] | Others |
|---|---|---|---|---|---|---|---|
| A-10 | 200 | 5 | — | 4.8 | 47 | 1.8 | SiC powder particle diameter: 100 μm |
| A-11 | 200 | 5 | — | 4.7 | 42 | 2.0 | SiC powder particle diameter: 100 μm / SiC powder amount: 60 mass % |
| A-12 | 5 | 0.05 | — | 6.0 | 45 | 1.6 | Foam resin: 1.0 mass % |
| A-13 | 800 | 15 | — | 6.0 | 72 | 0.8 | Foam resin: 1.0 mass % |
| A-14 | 50 | 5 | — | 0.3 | 45 | 1.6 | Foam resin: 1.0 mass % / pH adjustment with HCl |
| A-15 | 50 | 5 | — | 11 | 45 | 1.6 | Foam resin: 1.0 mass % / pH adjustment with NaOH |
| A-16 | 50 | 5 | — | 6.0 | 80 | 0.4 | Foam resin: 8.0 mass % |
| A-17 | 50 | 5 | — | 6.0 | 35 | 3.1 | Silica gel was changed to alumina gel / SiC powder was changed to alumina powder |
| A-18 | 50 | 5 | — | 4.5 | 35 | 2.5 | SiC powder particle diameter: 100 μm |

6. Manufacturing of Honeycomb Structures

Examples 7 to 27

Subsequently, 16 honeycomb segments were bonded to one another by use of bonding materials (bonding materials A-1 to A-18) shown in Tables 5 and 6, and dried at 200° C. for 2 hours. Afterward, an outer peripheral portion was ground so as to obtain a cylindrical shape, and the corresponding portion was coated with a coating material, and subjected to a thermal treatment at 500° C. for 2 hours, to obtain honeycomb structures (Examples 7 to 27).

TABLE 5

| | Bonding material | 4-point bending strength [kPa] | Compression Young's modulus [MPa] | Thermal conductivity [W/mK] | Thermal expansion coefficient [×10⁻⁶] | Thermal capacity [m⁻³/K] | Bonding material thickness [mm] | B-SP test | E-SP test | E/G test |
|---|---|---|---|---|---|---|---|---|---|---|
| Example 7 | A-1 | 600 | 200 | 1.0 | 4.5 | 1000 | 1 | 800° C. | ◎ | ◎ |
| Example 8 | A-2 | 550 | 150 | 0.7 | 4.5 | 800 | 1 | 900° C. | ◎ | ◎ |
| Example 9 | A-3 | 400 | 130 | 0.5 | 4.5 | 700 | 1 | 850° C. | ◎ | ◎ |
| Example 10 | A-4 | 900 | 80 | 0.6 | 4.5 | 800 | 1 | 1000° C. | ◎ | ◎ |
| Example 11 | A-5 | 1000 | 50 | 0.5 | 4.5 | 800 | 1 | 1100° C. | ◎ | ◎ |
| Example 12 | A-6 | 1000 | 50 | 0.5 | 4.5 | 800 | 1 | 1100° C. | ◎ | ◎ |
| Example 13 | A-7 | 500 | 80 | 0.5 | 4.5 | 800 | 1 | 800° C. | ◎ | ◎ |
| Example 14 | A-8 | 500 | 80 | 0.5 | 4.5 | 800 | 1 | 800° C. | ◎ | ◎ |
| Example 15 | A-9 | 1000 | 80 | 1.5 | 4.5 | 1100 | 1 | 1000° C. | ◎ | ◎ |

TABLE 5-continued

| | Bonding material | 4-point bending strength [kPa] | Compression Young's modulus [MPa] | Thermal conductivity [W/mK] | Thermal expansion coefficient [×10⁻⁶] | Thermal capacity [m⁻³/K] | Bonding material thickness [mm] | B-SP test | E-SP test | E/G test |
|---|---|---|---|---|---|---|---|---|---|---|
| Example 16 | A-10 | 1300 | 90 | 2.0 | 4.5 | 1300 | 1 | 1100° C. | ◎ | ◎ |
| Example 17 | A-11 | 1500 | 100 | 3.0 | 4.4 | 1300 | 1 | 1100° C. | ◎ | ◎ |
| Example 18 | A-11 | 1500 | 100 | 3.0 | 4.4 | 1300 | 3 | 1200° C. | ◎ | ◎ |

TABLE 6

| | Bonding material | 4-point bending strength [kPa] | Compression Young's modulus [MPa] | Thermal conductivity [W/mK] | Thermal expansion coefficient [×10⁻⁶] | Thermal capacity [m⁻³/K] | Bonding material thickness [mm] | B-SP test | E-SP test | E/G test |
|---|---|---|---|---|---|---|---|---|---|---|
| Example 19 | A-1 | 600 | 200 | 1.0 | 4.5 | 1000 | 0.05 | 500° C. | ◎ | ○ |
| Example 20 | A-1 | 600 | 200 | 1.0 | 4.5 | 1000 | 6 | 900° C. | ○ | ○ |
| Example 21 | A-12 | 300 | 250 | 0.9 | 4.5 | 1000 | 1 | 500° C. | ○ | ○ |
| Example 22 | A-13 | 300 | 110 | 0.8 | 4.5 | 680 | 1 | 500° C. | ◎ | ○ |
| Example 23 | A-14 | 250 | 200 | 1.0 | 4.5 | 800 | 1 | 400° C. | ◎ | ○ |
| Example 24 | A-15 | 250 | 200 | 1.0 | 4.5 | 800 | 1 | 400° C. | ○ | ○ |
| Example 25 | A-16 | 90 | 20 | 0.05 | 4.5 | 350 | 1 | 300° C. | ○ | ○ |
| Example 26 | A-17 | 1000 | 300 | 1.4 | 8.5 | 1500 | 1 | 500° C. | ○ | ○ |
| Example 27 | A-18 | 2000 | 300 | 11.0 | 4.3 | 1600 | 1 | 800° C. | ◎ | ○ |

Samples having a predetermined dimension were cut from the bonding layers of the honeycomb structures of Examples 7 to 27, and a four-point bending strength, a compression Young's modulus in a Z-axis direction (hereinafter sometimes simply referred to as the "compression Young's modulus"), a thermal conductivity, a thermal expansion coefficient and a thermal capacity were measured. To measure the four-point bending strength and the thermal expansion coefficient, rod-like samples having a size of 4 mm×30 mm and a thickness of 0.5 to 3 mm were used, and to measure the rest, samples having a size of 10×10 mm to 30×30 mm and a thickness of 0.5 to 3 mm were used. Methods for the each measurement will hereinafter be described. Moreover, the honeycomb structures of Examples 7 to 27 were subjected to a burner-spalling test (B-sp test), an electric furnace spalling test (E-sp test) and an engine test (E/G test). Evaluation results are shown in Tables 5 and 6. Methods for the each test will hereinafter be described.

[four-point bending strength]: The four-point bending strength was measured using the samples cut from the bonding layers in accordance with JIS R 1601 [bending strength Test Method of Fine Ceramics].

[Compression Young's modulus in Z-axis direction (compression Young's modulus)]: The modulus was calculated from a weight and a displacement curve in the samples cut from the bonding layers.

[Thermal conductivity]: A bonding layer portion was cut out to measure the thermal conductivity by a laser flash process.

[Thermal capacity]: The thermal capacity was calculated by multiplying, by a density, specific heat obtained by the laser flash process or with a differential thermal flow rate meter.

[B-sp test; burner spalling test (rapid heating test)]: Air heated with a burner was supplied through the honeycomb structure to make a temperature difference between the center and an outer portion, and thermal shock resistance was evaluated in accordance with a temperature at which no crack was generated in the honeycomb structure. The temperature (° C.) in the test result is the maximum temperature at which no crack was generated. When this temperature is high, the thermal shock resistance is high.

[E-sp test; electric furnace spalling test (rapid cooling test)]: The honeycomb structure was heated in an electric furnace at 500° C. for 2 hours to obtain a uniform temperature. Afterward, the heated honeycomb structure was taken out of the electric furnace at room temperature, and the thermal shock resistance was evaluated in accordance with the presence of cracks generated in the honeycomb structure. A case where no crack generation was recognized is shown by a "double circle" mark, and a case where the generation of a very small amount of cracks was recognized is shown by a "circle" mark. A case where the generation of a large amount of cracks was recognized is shown by a "cross" mark.

[Engine test (E/G test)]: On conditions that particulates accumulated were burnt to regenerate the filter so that the center of the honeycomb structure had a temperature of 1000° C., the thermal shock resistance was evaluated in accordance with the presence of the cracks. A case where no crack generation was recognized is shown by a "double circle" mark, and a case where the generation of a very small amount of cracks was recognized is shown by a "circle" mark. A case where the generation of a large amount of cracks was recognized is shown by a "cross" mark.

7. Results:

It has been found from Table 2 that it is possible is to obtain the honeycomb structure capable of bearing the actual use, even in a case where the bio-soluble fiber, usable without considering any influence on the health of a human body, is used. In addition, it has been found from Examples 1, 2 that it is possible to obtain the honeycomb structure having a characteristic equivalent to that made with a heretofore used ceramic fiber. Moreover, the honeycomb structures of Examples 7 to 18 indicated especially satisfactory results in all of the B-sp test, E-sp test, and E/G test.

INDUSTRIAL APPLICABILITY

In a honeycomb structure according to the present invention, a plurality of honeycomb segments are securely bonded to one another without causing any bonding defect such as crack or peel in the bonded portions of these segments. Therefore, the honeycomb structure can preferably be used as a catalyst carrier for an internal combustion engine, a boiler, a chemical reaction device, a reformer for a fuel cell, and the like in which a catalyst function is used, or as a filter for trapping fine particles in an exhaust gas and the like.

The invention claimed is:

1. A honeycomb structure made of a ceramics, consisting of a plurality of honeycomb segments provided with cell structures having a plurality of cells constituting fluid channels divided by porous partition walls and porous outer walls on outer peripheries of the cell structures, and integrated by bonding the outer walls to one another with a bonding material containing a bio-soluble fiber comprising at least one of MgO and CaO, wherein a content of an alkali metal oxide in the bio-soluble fiber is 2 mass % or less, and the bio-soluble fiber contains 70 to 95 mass % of $SiO_2$.

2. The honeycomb structure according to claim 1, wherein the bio-soluble fiber has thermal resistance at a temperature of 1200° C. or more.

3. The honeycomb structure according to claim 1, wherein the bonding material further contains inorganic particles and/or a colloidal oxide.

4. The honeycomb structure according to claim 3, wherein the inorganic particles contained in the bonding material are silicon carbide.

5. The honeycomb structure according to claim 1, wherein the bonding material further contains an inorganic binder.

6. The honeycomb structure according to claim 1, wherein the bonding material further contains an organic binder.

7. The honeycomb structure according to claim 1, wherein the bio-soluble fiber has an average length of 10 to 600 mm, and has an average diameter of 0.1 to 10 mm.

8. The honeycomb structure according to claim 1, wherein a bonding material slurry for use as the bonding material has a pH of 0.5 to 10.

9. The honeycomb structure according to claim 1, wherein the bonding material has a four-point bending strength of 100 to 3000 kPa.

10. The honeycomb structure according to claim 1, wherein the bonding material has a compression-Young's modulus of 5 to 500 MPa.

11. The honeycomb structure according to claim 1, wherein the bonding material has a thermal conductivity of 0.1 to 10 W/mK.

12. The honeycomb structure according to claim 1, wherein the bonding material has a thermal expansion coefficient of $1 \times 10^{-6}$ to $8 \times 10^{-6}$/K.

13. The honeycomb structure according to claim 1, wherein the bonding material has a thermal capacity of 400 to 4500 $Jm^3$/K.

14. The honeycomb structure according to claim 1, wherein the bonding material has a porosity of 17 to 70%.

15. The honeycomb structure according to claim 1, wherein the bonding material has a density of 0.5 to 3 $g/cm^3$.

16. The honeycomb structure according to claim 1, wherein a layer formed of the bonding material has a thickness of 0.1 to 5 mm.

17. A ceramic bonding material containing a bio-soluble fiber having thermal resistance at 1200° C. or more and containing 70 to 95 mass % of $SiO_2$, wherein the bio-soluble fiber comprises at least one of MgO and CaO, and a content of an alkali metal oxide in the bio-soluble fiber is 2 mass % or less.

* * * * *